(12) United States Patent
Guest

(10) Patent No.: US 9,551,447 B2
(45) Date of Patent: Jan. 24, 2017

(54) CONNECTOR FOR CONNECTING TO A TUBE

(71) Applicant: JOHN GUEST INTERNATIONAL LIMITED, Middlesex (GB)

(72) Inventor: Timothy Steven Guest, Middlesex (GB)

(73) Assignee: John Guest International Limited, Middlesex (GB)

( * ) Notice: Subject to any disclaimer, the term of this patent is extended or adjusted under 35 U.S.C. 154(b) by 136 days.

(21) Appl. No.: 14/511,953

(22) Filed: Oct. 10, 2014

(65) Prior Publication Data

US 2015/0102598 A1 Apr. 16, 2015

(30) Foreign Application Priority Data

Oct. 10, 2013 (GB) .................................. 1317952.8

(51) Int. Cl.
*F16L 37/091* (2006.01)
*F16L 37/092* (2006.01)

(52) U.S. Cl.
CPC .................................. *F16L 37/0925* (2013.01)

(58) Field of Classification Search
CPC ..... F16L 37/0925; F16L 37/091; F16L 19/086
USPC .................................. 285/39, 322, 323, 324
See application file for complete search history.

(56) References Cited

U.S. PATENT DOCUMENTS

| | | |
|---|---|---|
| 4,005,883 A | 2/1977 | Guest |
| 4,573,716 A | 3/1986 | Guest |
| 4,606,783 A | 8/1986 | Guest |
| 4,637,636 A | 1/1987 | Guest |
| 4,645,246 A | 2/1987 | Guest |
| 4,650,529 A | 3/1987 | Guest |
| 4,657,286 A | 4/1987 | Guest |
| 4,722,560 A | 2/1988 | Guest |
| 4,804,213 A | 2/1989 | Guest |
| 4,923,220 A | 5/1990 | Guest |
| 4,946,213 A | 8/1990 | Guest |
| 4,958,858 A | 9/1990 | Guest |
| 5,370,423 A | 12/1994 | Guest |
| 5,390,969 A | 2/1995 | Guest |
| 5,401,064 A | 3/1995 | Guest |
| 5,443,289 A | 8/1995 | Guest |

(Continued)

FOREIGN PATENT DOCUMENTS

| | | |
|---|---|---|
| EP | 0587433 A1 | 3/1994 |
| EP | 2 400 201 A1 | 12/2011 |

(Continued)

OTHER PUBLICATIONS

United Kingdom Search Report issued May 6, 2014, filed in GB Application No. GB 1317952.8, filed Oct. 10, 2013.

*Primary Examiner* — Rodney Mintz
*Assistant Examiner* — Daniel Kenny
(74) *Attorney, Agent, or Firm* — Workman Nydegger

(57) ABSTRACT

A connector having a body 1 with a central throughway in which a tube T is received. A collet 30 within the body has a plurality of flexible legs 32 arranged to grip the tube T if a force is applied to withdraw the tube. The connector further comprises at least one first tooth 14, the first tooth having a gripping edge in a plane angled to a plane perpendicular to the main axis of the connector, and being mountable with respect to the body so as to be non-rotatable about the main axis X.

15 Claims, 8 Drawing Sheets

(56) References Cited

U.S. PATENT DOCUMENTS

| | | |
|---|---|---|
| 5,468,027 A | 11/1995 | Guest |
| 5,607,193 A | 3/1997 | Guest |
| 5,683,121 A | 11/1997 | Guest |
| 5,738,387 A | 4/1998 | Guest |
| 5,775,742 A * | 7/1998 | Guest ............... F16L 37/0925 285/322 |
| 5,779,284 A | 7/1998 | Guest |
| 5,915,738 A | 6/1999 | Guest |
| 6,056,326 A | 5/2000 | Guest |
| 6,086,044 A * | 7/2000 | Guest ............... F16L 37/0925 251/148 |
| 6,109,664 A * | 8/2000 | Guest ............... F16L 37/0925 285/319 |
| 6,173,999 B1 | 1/2001 | Guest |
| 6,439,620 B1 | 8/2002 | Guest |
| 6,863,314 B2 | 3/2005 | Guest |
| 6,880,865 B2 | 4/2005 | Guest |
| 6,908,120 B2 * | 6/2005 | Tomita ............... F16L 37/0915 285/306 |
| RE38,786 E | 8/2005 | Guest |
| 6,929,289 B1 | 8/2005 | Guest |
| 6,957,833 B2 | 10/2005 | Guest |
| 7,032,932 B2 * | 4/2006 | Guest ............... F16L 19/005 285/322 |
| 7,082,957 B2 | 8/2006 | Guest |
| 7,100,948 B2 | 9/2006 | Guest |
| 7,186,371 B1 | 3/2007 | Watling |
| 7,410,193 B2 | 8/2008 | Guest |
| 7,425,022 B2 * | 9/2008 | Guest ............... F16L 37/0925 285/322 |
| 7,506,658 B2 | 3/2009 | Guest et al. |
| 7,644,959 B2 | 1/2010 | Guest |
| 7,758,085 B2 | 7/2010 | Guest |
| 8,029,024 B2 | 10/2011 | Guest |
| 8,056,937 B2 | 11/2011 | Guest |
| 8,444,325 B2 | 5/2013 | Guest |
| 2002/0109353 A1 | 8/2002 | Guest |
| 2003/0085568 A1 | 5/2003 | Guest |
| 2003/0201641 A1 | 10/2003 | Guest |
| 2003/0201643 A1 | 10/2003 | Guest |
| 2003/2021642 | 10/2003 | Guest |
| 2004/0061329 A1 | 4/2004 | Guest |
| 2004/0084107 A1 | 5/2004 | Guest |
| 2005/0264009 A1 | 12/2005 | Guest |
| 2006/0181080 A1 | 8/2006 | Guest |
| 2006/0202478 A1 | 9/2006 | Guest |
| 2007/0034255 A1 | 2/2007 | Guest |
| 2007/0194568 A1 | 8/2007 | Guest |
| 2007/0200344 A1 | 8/2007 | Guest |
| 2008/0136166 A1 | 6/2008 | Guest |
| 2008/0309081 A1 | 12/2008 | DeWild |
| 2009/0025152 A1 | 1/2009 | Guest |
| 2009/0140514 A1 | 6/2009 | Guest |
| 2011/0033165 A1 | 2/2011 | Guest |
| 2011/0309614 A1 | 12/2011 | Guest |
| 2013/0257036 A1 | 10/2013 | Guest |
| 2013/0257043 A1 | 10/2013 | Guest |

FOREIGN PATENT DOCUMENTS

| | | |
|---|---|---|
| WO | 98/21516 A1 | 5/1998 |
| WO | 98/30825 A1 | 7/1998 |

* cited by examiner

CONNECTOR FOR CONNECTING TO A TUBE

CROSS-REFERENCE TO RELATED APPLICATIONS

This application claims priority to United Kingdom Application No. 1317952.8, filed Oct. 10, 2013, the contents of which is incorporated herein by specific reference.

BACKGROUND OF THE INVENTION

1. The Field of the Invention

The present invention relates to a connector for connecting to a tube.

2. The Relevant Technology

In particular, the invention is directed to an improvement in a connector for connecting to a tube, the connector having a body with a central throughway in which the tube is received, in use, and defining a main axis at its centre; a collet retained within the body, the collet comprising a plurality of flexible legs, the legs being arranged to bear against a cam surface in the body such that a force on the collet tending to pull it out of the body causes the legs to interact with the cam surface and be deflected inwardly to grip the tube, in use. Such a connector will subsequently be referred to as "of the kind described".

Collets of the kind described have been made by the applicant for decades. The collets are designed to grip the tube and stop it from moving in an axial direction. However, they do not stop the tube from rotating as the collet itself can typically rotate within the connector. In some cases, such as that disclosed in EP 2 400 201, the collet is prevented from rotating within its housing. In this case, the teeth on the collet simply cut a circumferential groove in the tube allowing it to rotate freely. In many cases, this ability for the tube to rotate is not a problem and may indeed be an advantage as it keeps torsional stresses on the tube to a minimum.

However, in some circumstances, it would be advantageous for the tube not to be able to rotate within the connector. For example, in a shut-off valve, particularly one with a long actuator handle, the valve would be easier and more convenient to use if the valve's radial orientation was fixed. This would also result in a neater installation.

The present invention is aimed at providing a connector of the kind described in which the tube cannot readily rotate within the connector.

SUMMARY OF THE INVENTION

According to the present invention, a connector of the kind described is characterised by further comprising at least one first tooth, the first tooth having a gripping edge in a plane angled to a plane perpendicular to the axis, and being mounted with respect to the body so as to be non-rotatable about the main axis.

A tooth which is angled in this way is much more readily able to resist rotation of the tube than a conventional collet tooth. Because it is angled, the tooth presents a broader face than the "knife edge" represented by a typical collet tooth.

Even a small angle between the gripping edge and the plane perpendicular to the axis will cause some degree of resistance to rotation. However, preferably, the angle is between 20° and 70° and more preferably between 30° and 60° with respect to the plane perpendicular to the axis.

The or each first tooth may be in the collet and the collet is non-rotatable about the main axis with respect to the body. Alternatively, the or each first tooth may be in a component different from the collet which is non-rotatable about the main axis with respect to the body.

The tooth may be positioned in a non-tapering portion of the throughway. However, this will provide relatively little gripping force, or may unduly interfere with the tube upon insertion. Preferably, therefore, the housing has a tapered surface which tapers in the axial direction positioned to urge the or each first tooth radially inwardly as it is moved axially into the body. This initially allows greater room for insertion of the tube, but causes the or each first tooth to be urged radially inwardly thereby increasing the gripping force and hence the resistance to rotation of the tube.

It is possible for the tube itself to urge the or each first tooth onto the tapered surface upon insertion. However, preferably, the connector further comprises a locking ring which is arranged to be advanced along the body after insertion of the tube and, in doing so, to cause the tapered surface to urge the first teeth radially inwardly. Thus, the tube will be inserted into the correct position without interference from the or each first tooth, whereupon the locking ring can be moved into place thereby causing the or each first tooth to grip the tube.

The body may also be provided with a radially tapered surface positioned to urge the first teeth radially inwardly as they are urged about the axis. The nature of this radially tapered surface means that, should the tube and hence the or each first tooth begin to be rotated about the axis, the radially tapered surfaces will cause the or each tooth to grip the tube more tightly thereby increasing the resistive force with the rotational force.

If the collet is to be non-rotatable within the body, this may be done by the collet engaging with features on the inside of the body. Alternatively, the connector may further comprise a bushing which has at least one leg which co-operates with the collet legs to prevent rotation of the collet. This bushing may provide the above mentioned component which is provided with the first teeth. As such, the bushing will serve both to carry the or each first tooth and also to prevent rotation of the collet.

As a further alternative, the collet is provided with features on the end faces of the legs which engage with complementary features that are fixed with respect to the body to prevent rotation of the collet. These complementary features may be provided directly on the body, or may be provided on a ring which has a set of teeth that engage with the housing to prevent rotation of the ring with respect to the housing.

It is not necessary for the collet to have teeth. If this is the case, the or each first tooth may assist the collect to some extent in resisting axial movement of the tube. However, preferably, the connector further comprises at least one second tooth, the second tooth being on the collet and having a gripping edge in the plane perpendicular to the axis. This enhances the ability of the collet to provide a resistance to axial movement of the tube.

A single first tooth will provide a reasonable degree of resistance to rotation. However, preferably, there are a plurality of discrete first teeth circumferentially spaced about the main axis. This provides a better distributed resistive force. When there is more than one first tooth, the first teeth on opposite sides of the connector may be coplanar. However, preferably, each first tooth is angled in the opposite sense to the first tooth on the opposite side of the connector. Effectively, when viewed from the side, looking down on a pair of opposite first teeth, the first teeth will cross one another in a X shape. Again, this provides for a better distributed resistive force and one which would not tend to generate a resultant axial force on the connector. The first tooth may not have a pair on the exact opposite side of the connector, for example if there are an odd number of first teeth. However, it is preferable that the first teeth are still angled in the opposite sense as compared to those teeth with are generally on the opposite side of the connector.

BRIEF DESCRIPTION OF THE DRAWINGS

Examples of connectors in accordance with the present invention will now be described with reference to the accompanying drawings, in which.

DETAILED DESCRIPTION OF THE PREFERRED EMBODIMENTS

Before describing the examples, the nomenclature used in the subsequent description will be explained. The connectors are generally tubular in nature and have a main axis X which also corresponds to the axis of a tube inserted into the connector. The connector has a mouth at one end into which the tube is inserted. The radial and circumferential directions are defined with respect to the axis X. The end with the mouth will be referred to as the proximal end and the opposite end is the distal end.

A First Example of a Connector is Shown in FIGS. 1 to 4.

Figure 3:
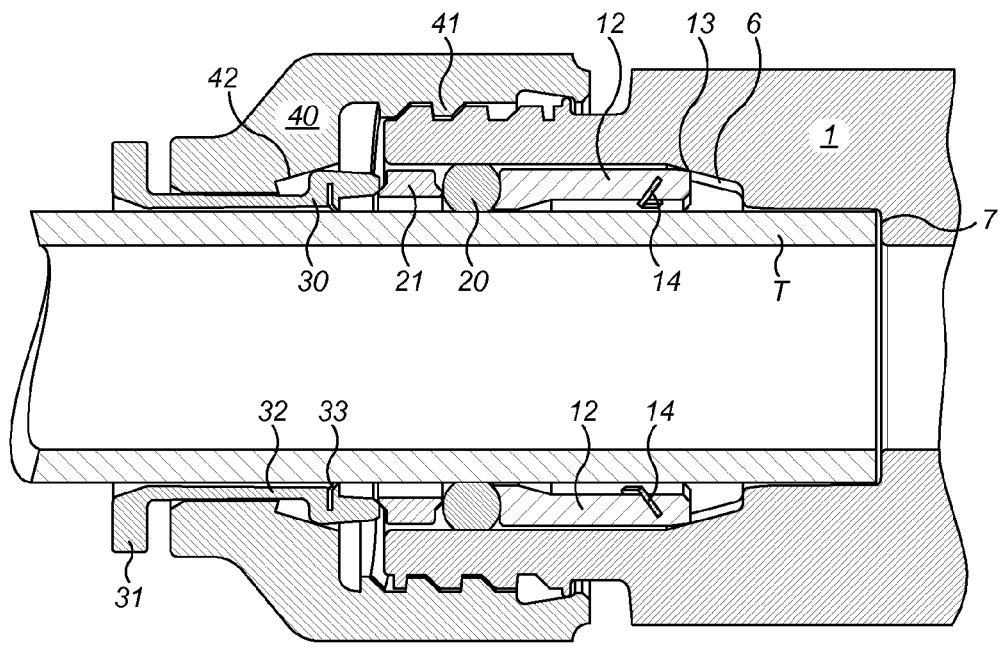
FIG. 3 is a cross-section of the connector of the first example with the tube inserted and with the locking ring unlocked.
Figure 4:
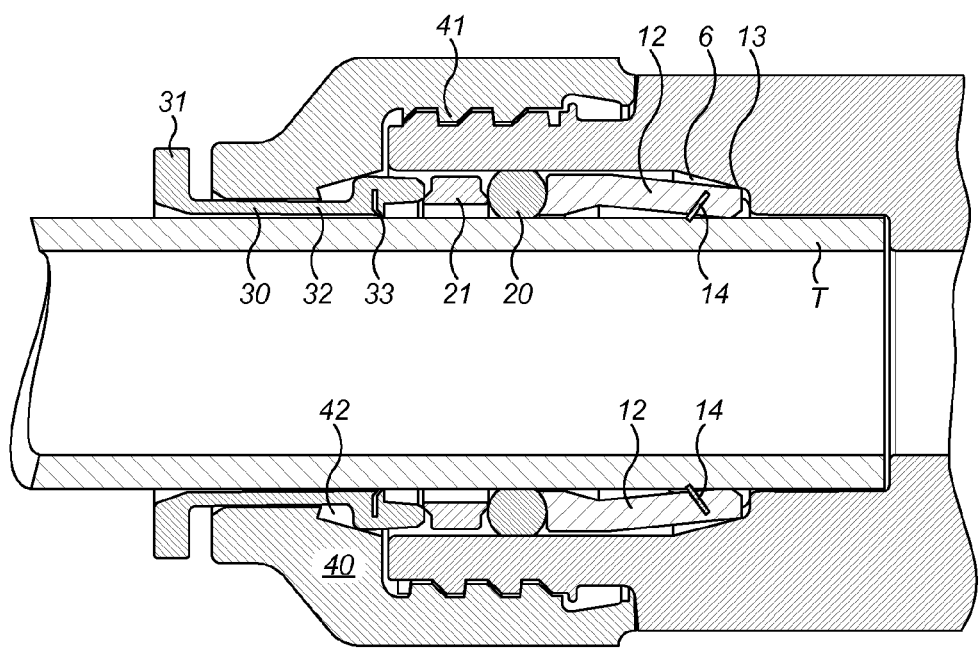
FIG. 4 is a view similar to FIG. 3 with the locking ring locked.

This comprises a main body 1 having a generally tubular configuration centred on axis X and having a throughway 2 extending from the relatively wide mouth 3 at the proximal end to a narrow outlet 4 at the distal end. Within the throughway 2 approximately midway along the body 1 are a number of circumferentially arranged castellations 5 best shown in FIG. 2. These are arranged so that the diameter of the throughway is intermittently narrow at this point. Between the castellations 5, there is a ramped surface 6 which represents a gradual decrease in the cross-section of the throughway 2 towards the distal end. The purpose of the castellations 5 and ramped surface 6 is described below. Towards the outlet 4, the throughway 2 is provided with an annular shoulder 7 which represents a step-down in the cross-section and provides an end stop for the tube T as best shown in FIGS. 3 and 4. The proximal end of the body 1 is provided with a male screw thread 8 the purpose of which is described below.

Figure 1:
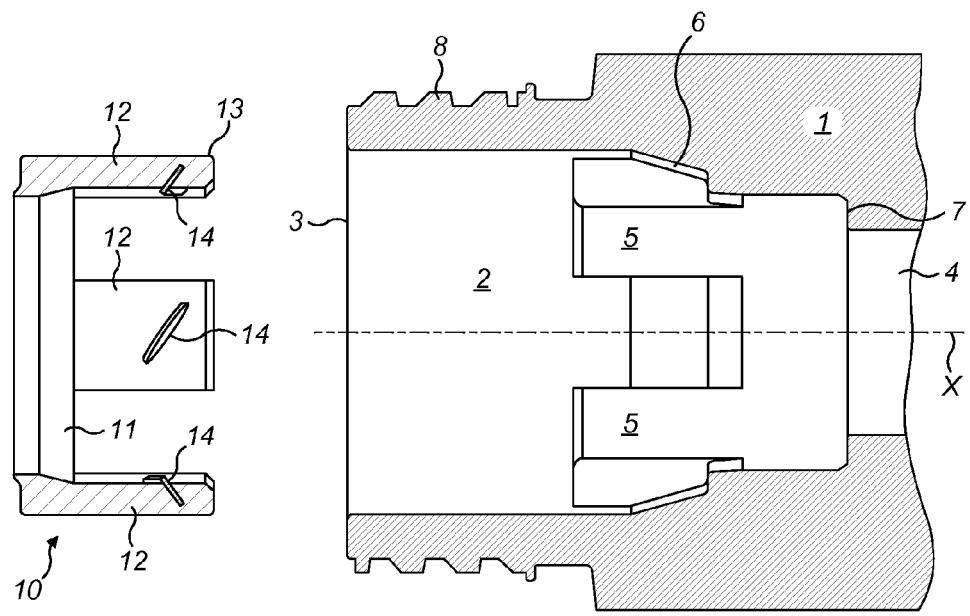
FIG. 1 is a cross-section of a housing and bushing of a first example prior to assembly.
Figure 2:
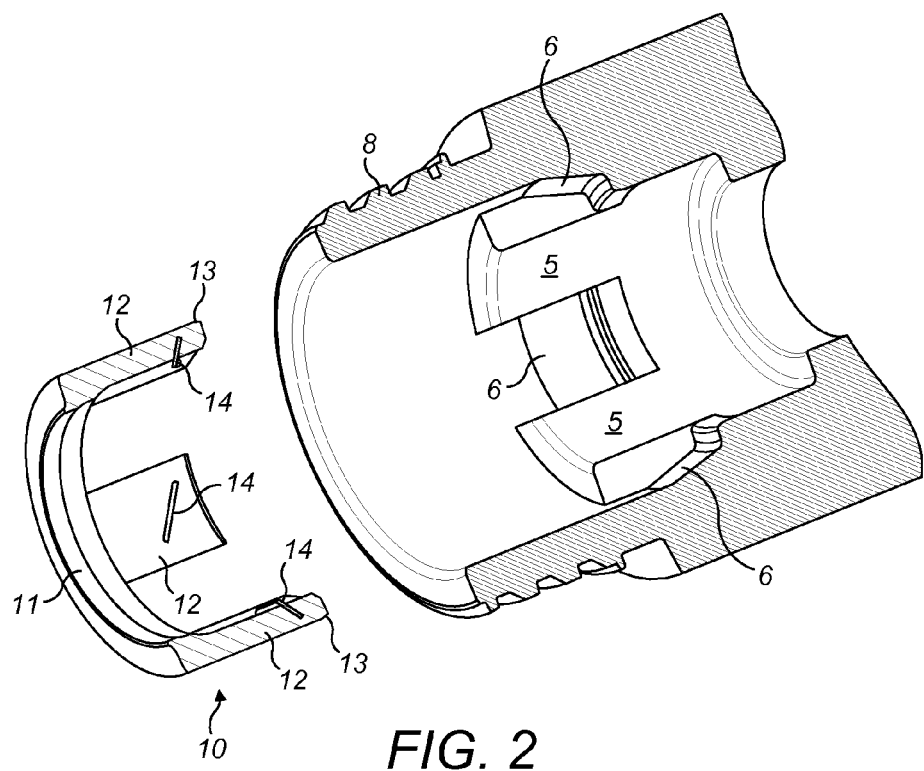
FIG. 2 is a cut-away perspective of the components of FIG. 1.

The first component to be inserted into the throughway 2 of the housing 1 is an annular bushing 10. This has an annular portion 11 at the proximal end from which a number of legs 12 project distally. These legs 12 correspond in number and size to the spaces between castellations 5 into which they fit. The outermost edge 13 of each of the legs 12 engages with the ramp 6 as best shown in FIGS. 3 and 4. Each of the legs 12 is provided with an angled tooth 14. When viewed in the plan view, the tooth 14 is at an angle of approximately 45° with respect to the axis X as best shown in FIG. 1.

After the bushing 10 is inserted into the throughway 2 in the main body 1, this is followed by an O-ring seal 20 which engages with the annular portion 11 of the bushing 10 and creates a seal between the tube T and the main body 1. As can be seen from FIGS. 3 and 4, the bushing 10 is on the same side of the seal 20 as the tube T and is referred to as the "wet" side.

Behind the O-ring 20 is a spacer ring 21 which abuts against the seal 20.

Behind the spacer ring 21 is a collet 30 which has a conventional construction. This comprises an annular end portion 31 at the proximal end from which a number of legs 32 extend distally. Each leg 32 has an inwardly projecting second tooth 33 the cutting edge of which is in a plane perpendicular to the axis X in conventional fashion.

A locking ring 40 surrounds a central portion of the collet 30 and has a female screw thread 41 which engages with the male screw thread 8 on the connector 1. In its initial configuration, the components of the connector are in the position shown in FIG. 3 in which the locking ring 40 is not fully threaded onto the main body 1. Thus, the components within the throughway are free to move axially to a small extent. With the connector in this configuration, the tube T is inserted into the throughway 2 until it lands on the shoulder 7. Once it is fully engaged, the locking ring 40 is screwed down into the body 1 moving the components to the position shown in FIG. 4. As the locking ring 40 is screwed down, the ramped surface 42 engages with the legs 32 of collet 30 and moves them distally. This, in turn, pushes the spacer ring 21, O-ring seal 20 and bushing 10 distally into the position shown in FIG. 4. The edges 31 of legs 12 of the bushing 10 run up ramp 6 and are forced inwardly thereby causing the angled teeth 14 to grip the tube T as shown in FIG. 4. The components are held in this position because the locking ring 40 prevents them from moving axially. Any axial force on a tube T in a direction pulling it out of the connector causes the second teeth 33 of the collet to grip the tube T more tightly as the legs are forced up the ramp 42 as is conventional with a collet of this type. In addition, any force tending to cause the tube T to rotate about the axis X is resisted by the angled teeth 14.

As illustrated in the drawings, the sides of the castellations 5 and the corresponding legs 12 are in a generally radial plane. However, these surfaces could be inclined to this radial plane in the sense that any rotational force applied to the bushing 10 will cause the legs 12 to ride up these inclined surfaces thereby increasing the gripping force exerted by the angled teeth 14 as the tube is rotated in a similar manner to that in which the second teeth 33 of the collet provide an increased gripping force caused by the ramped surface 42.

In order to remove the tube T from the connector, the locking ring 40 is unscrewed to the position shown in FIG. 3 and the collet 30 is depressed into the connector such that the collet legs can expand radially free from influence by the ramped surface 42. Similarly, the legs 12 of the bushing 10 are free to slide back up the ramp 6 again releasing the tube so that it can simply be pulled out of the connector.

A Second Example of a Connector is Shown in FIGS. 5-8.

In this, similar components will be designated with the same reference numerals, and only the differences are described in detail.

Figure 5:
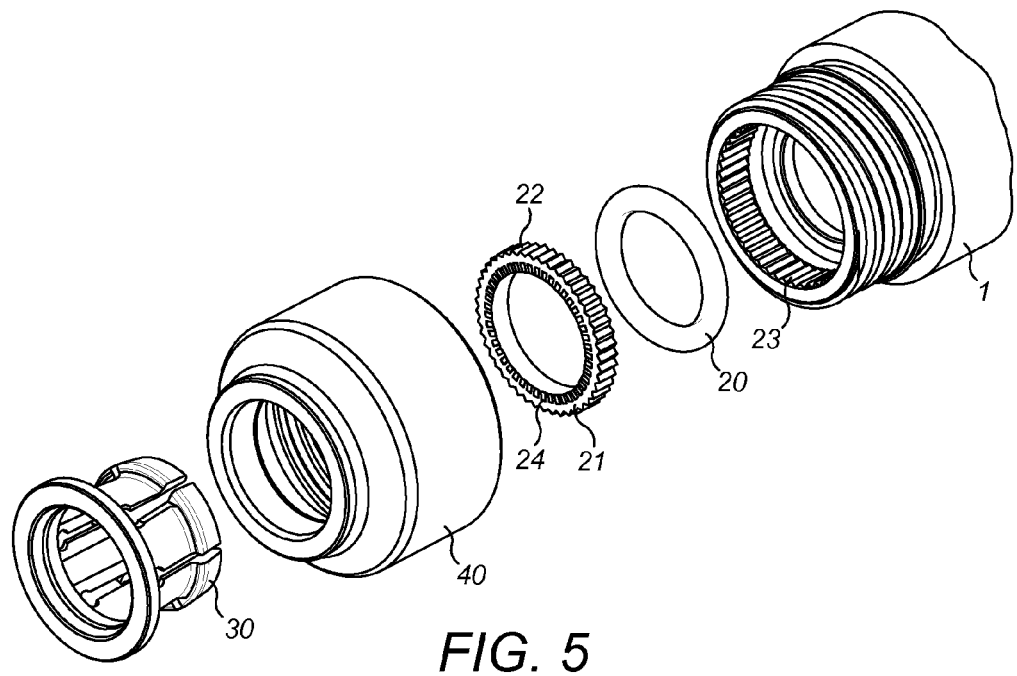
FIG. 5 is an exploded perspective view of a second example.
Figure 6:
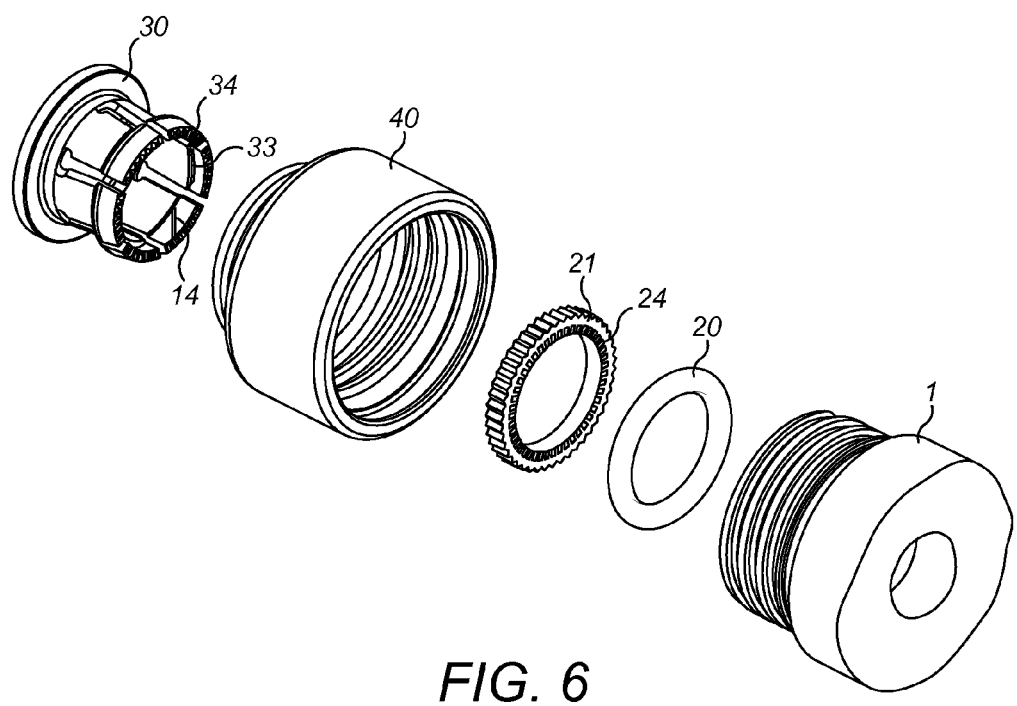
FIG. 6 is a perspective view similar to FIG. 5 but from the opposite end.

In the second example, the bushing 10 from the first example as well as the castellations 5 and ramps 6 are no longer present. Instead, the angled teeth 14 are provided on the collet 30 as best shown in FIG. 6. All of the teeth may be of the angled type. Alternatively, some may be angled, while some are conventional teeth 33 in the radial plane as shown in FIG. 6. In place of the bushing 10, the second example uses features on the end of the collet and the spacer in order to prevent rotation. Thus, the spacer is provided with a plurality of teeth 22 on its radially outermost surface which engage with complimentary teeth 23 of an inner face of the proximal end of the main body 1 as best shown in FIG. 5. Once the spacer 21 is in place, the teeth 22 and 23 engage with one another preventing rotation of the spacer 21. On the axial end faces of the spacer ring 21 are a number of circumferentially arranged protrusions 24. As is apparent from FIGS. 5 and 6, these are present on both faces of the spacer ring 21. However, only those facing the collet are operative. They are provided on both sides so that the spacer 21 can be inserted either way up. Complementary protrusions 34 are provided on the distal end face of the collet 30 as shown in FIG. 6. These engage with the protrusions 24 on the spacer ring 21 so that the collet 30 cannot rotate in respect to the spacer 21 and hence with respect to the rest of the coupling. Although described as protrusions 24, 34, these could equally be recesses in one of the surfaces. The important requirement is that the two sets of features are complementary and prevent the relative rotation as described above.

Figure 7:
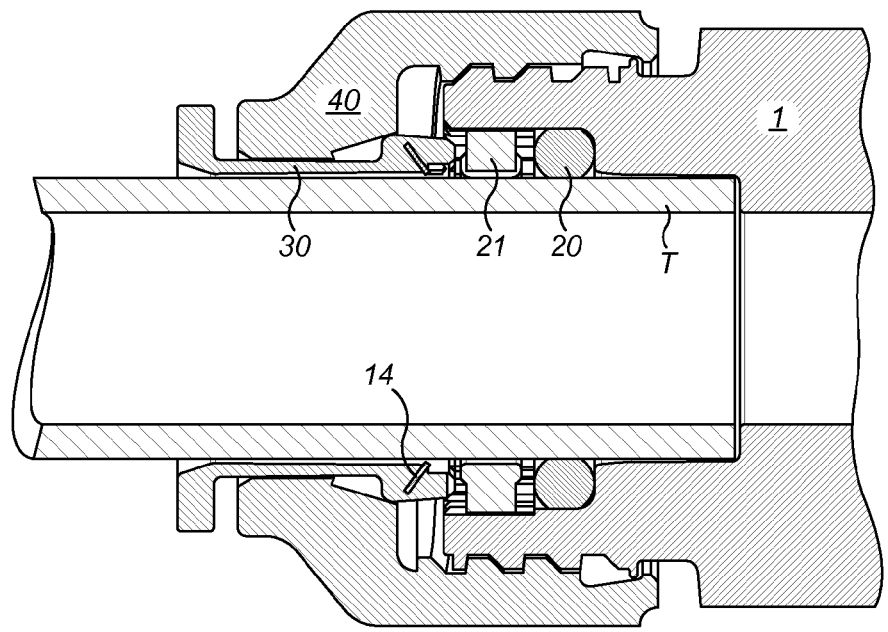
FIG. 7 is the view equivalent to FIG. 3 but of a second example.
Figure 8:
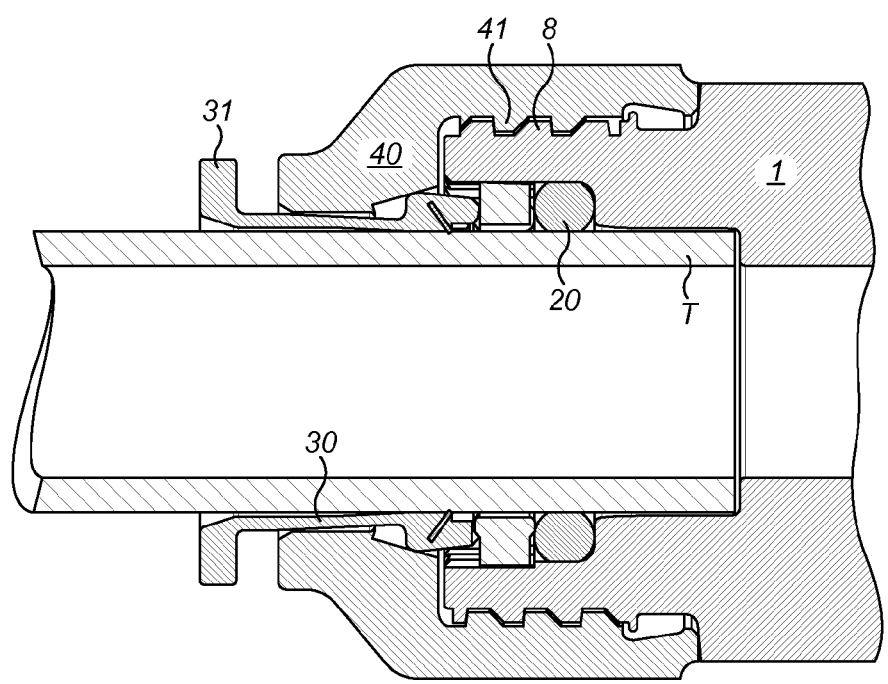
FIG. 8 is a view equivalent to FIG. 4 but of the second example.
Figure 9:
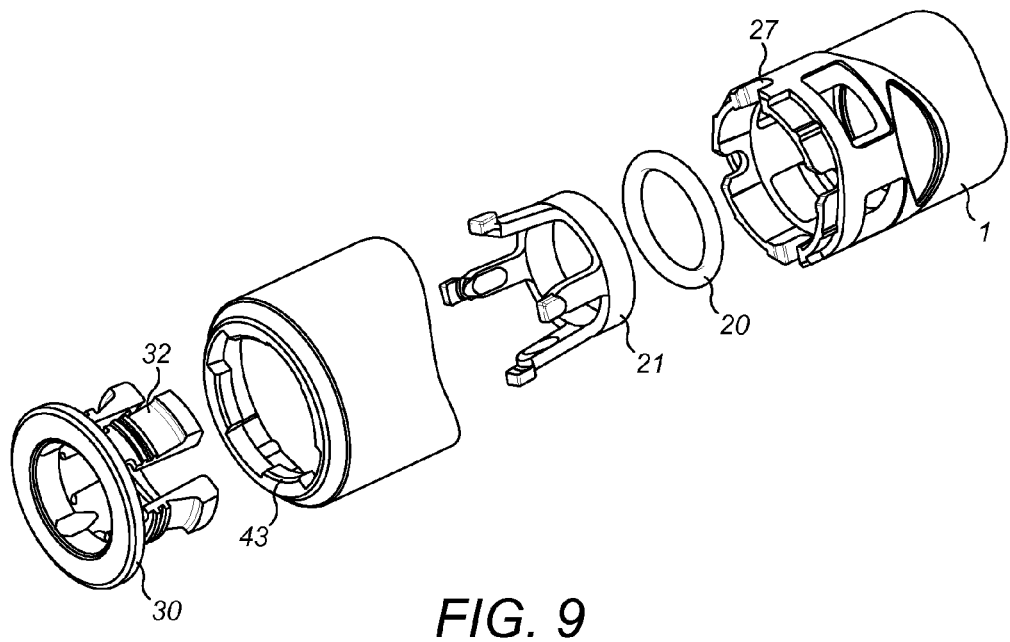
FIG. 9 is an exploded perspective view of a third example.

With the components in the configuration shown in FIG. 7, the tube T is inserted. The locking ring 40 is then screwed into the position shown in FIG. 8 causing the collet teeth to move inwardly and grip the tube as described above. This also causes the protuberances 24 and 34 to engage with one another therefore preventing rotation of the tube T.

A Third Example of a Connector is Shown in FIGS. 9-12.

This example is similar to the second example in that the angled teeth 14 are provided on the collet. The spacer 21 is provided with four proximally protruding legs 25 with enlarged ends 26 which land in U-shape recesses 27 in the proximal end face of the main body 1. The legs 32 of the collet fit between these legs 25 such that the collet cannot rotate.

The locking ring 40 does not have a screw-thread, but is arranged to rotate through 900 with respect to the main body 1, such that features 43 engage with the collet 30 and urge it away from the main body 1. The distal end has an undulating profile 44 which selectively covers features 45 on the body 1 to provide a visual indication that the locking ring is at its locked positioned.

Figure 10:
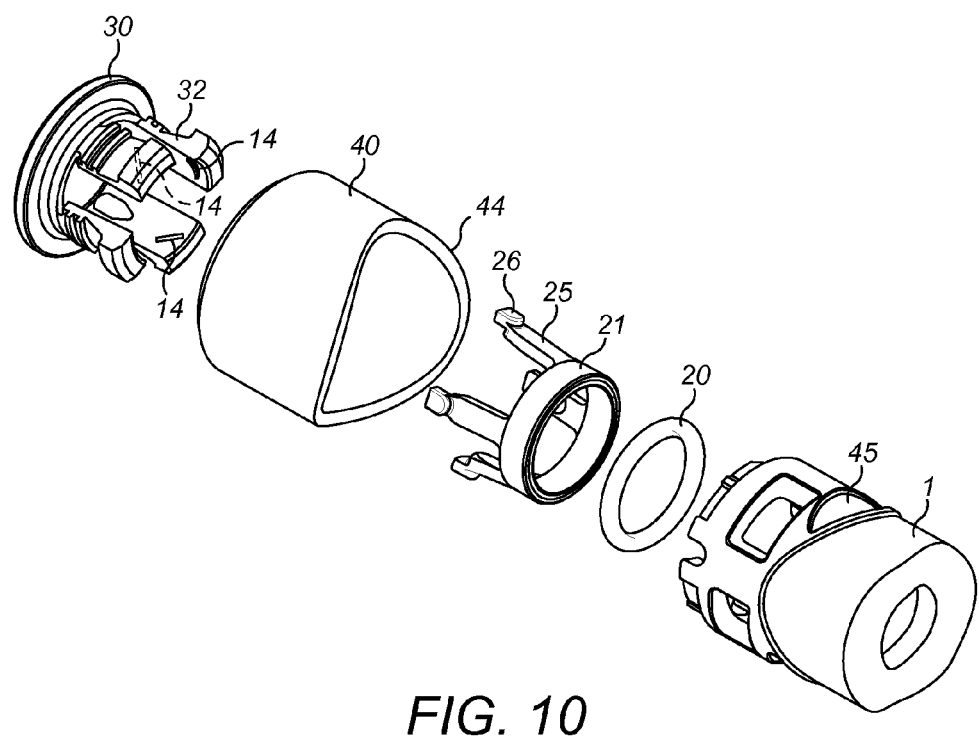
FIG. 10 is an exploded perspective view from the end opposite to FIG. 9.
Figure 11:
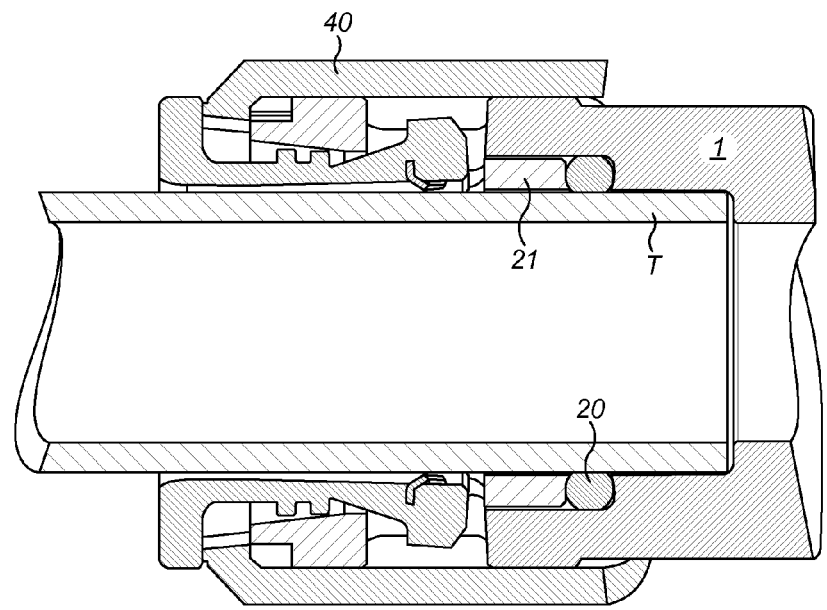
FIG. 11 is a view equivalent to FIG. 3, but of a third example.
Figure 12:
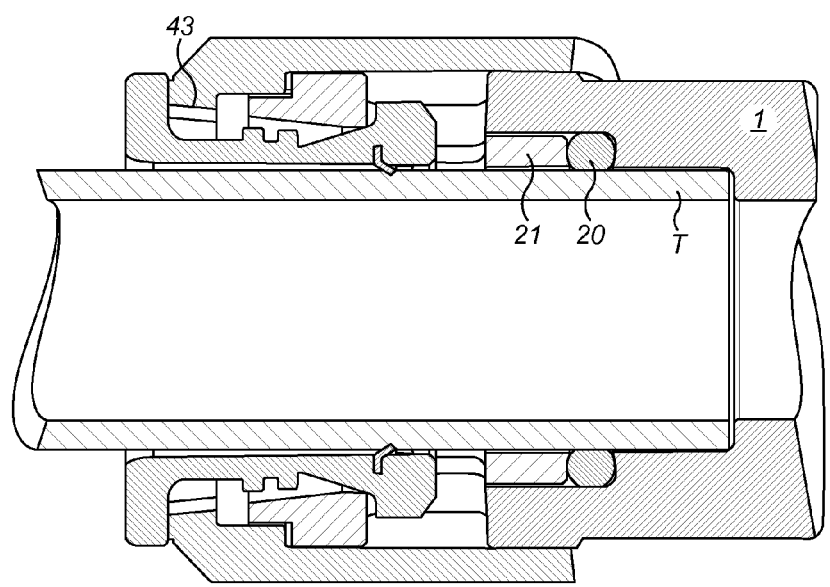
FIG. 12 is a view similar to FIG. 4 but of a third example.
Figure 13:
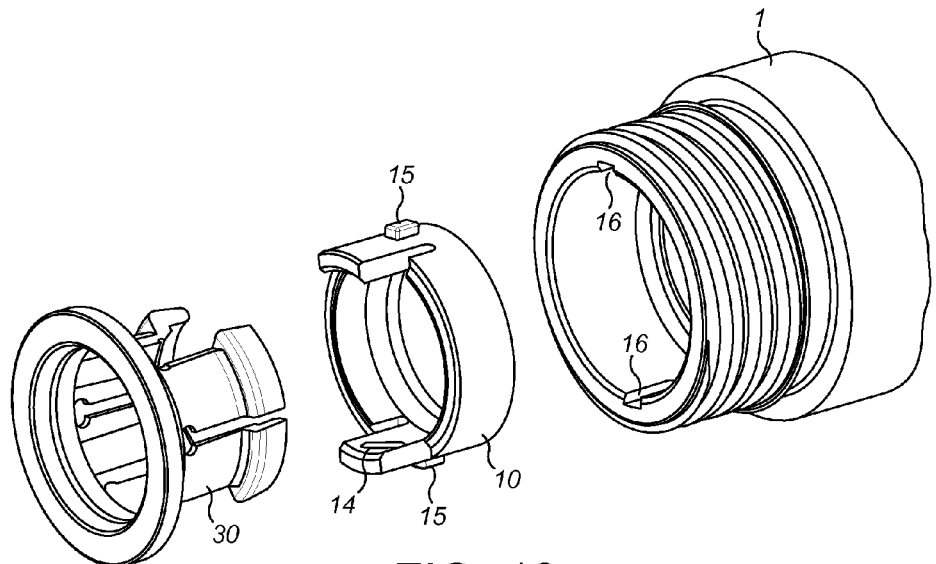
FIG. 13 is an exploded perspective view of a fourth example.
Figure 14:
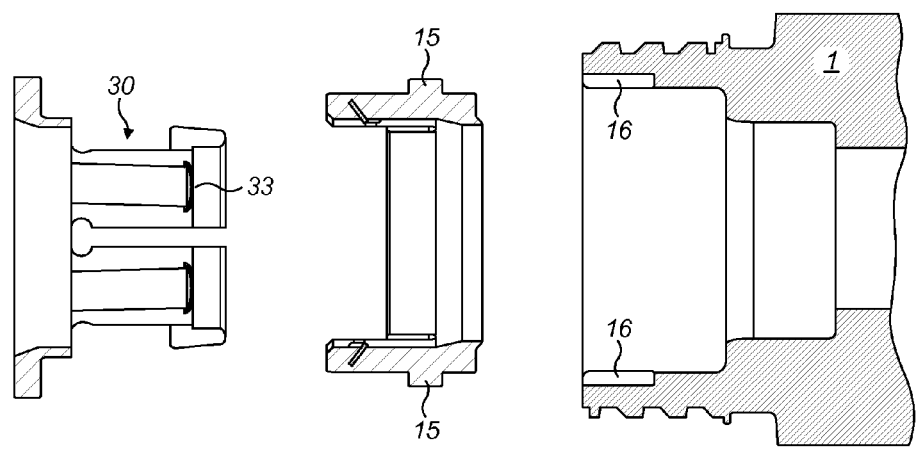
FIG. 14 is an exploded cross-section of the fourth example.

FIG. 10 also illustrates how the angled teeth 14 on opposite sides of the connector are oriented. As can be seen in FIG. 10, the tooth on one side is angled in the opposite sense to the tooth on the other side such, if the two were viewed directly from the side, they would cross in an X shape.

A Fourth Example of a Connector is Shown in FIGS. 13-16.

The fourth example is similar in construction and operation to the first example, in that it has a bushing 10 with the angled teeth 14. In the fourth example, rotation of the bushing 10 is prevented by a pair of projections 15 which fit into complementary keying slots 16 in the inner face of the proximal end of the main body 1.

Figure 15:
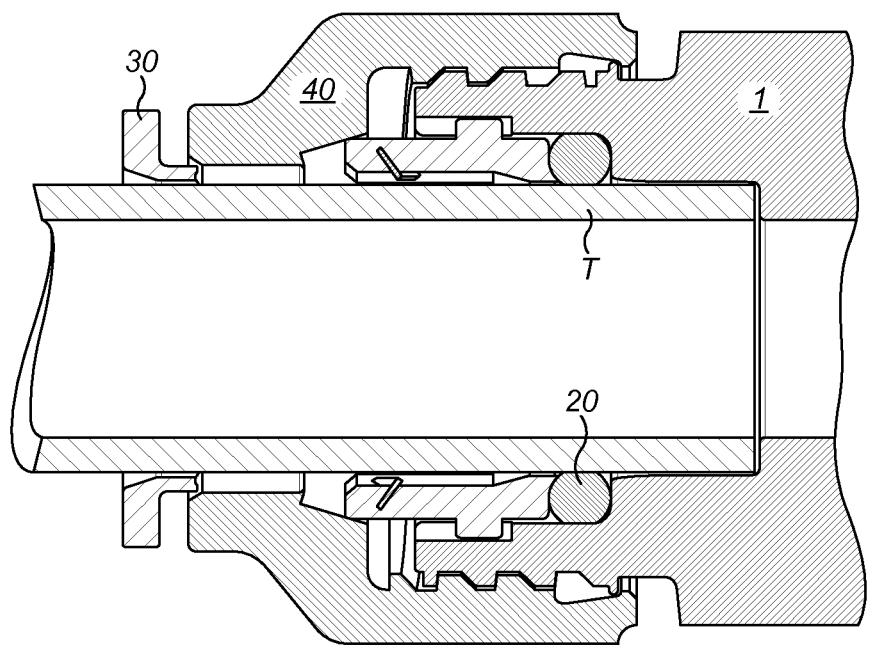
FIG. 15 is a view similar to FIG. 3, but of the fourth example.
Figure 16:
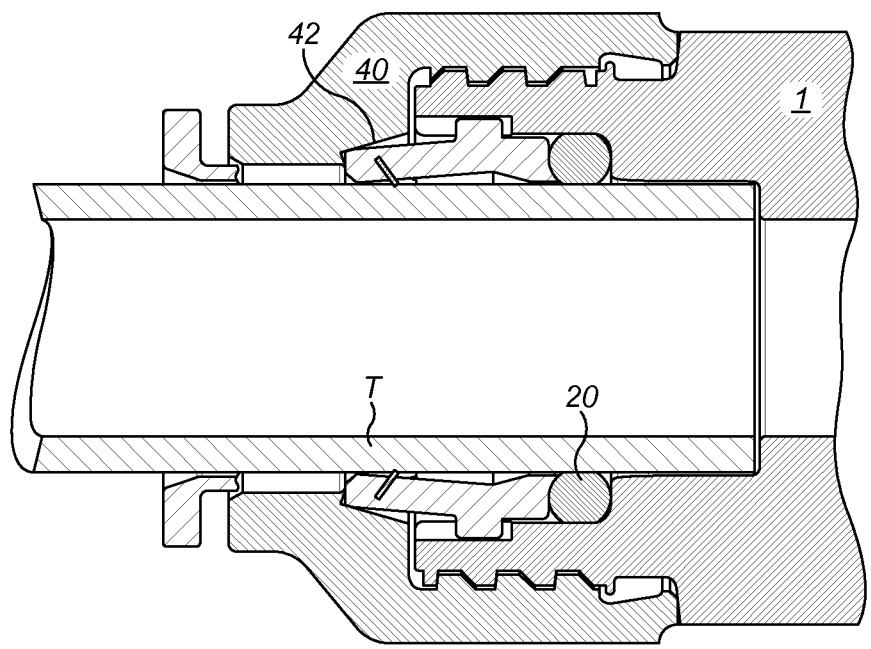
FIG. 16 is a view equivalent to FIG. 4, but of the fourth example.

The operation of this connector is broadly the same as that of the first example. However, as best seen in FIGS. 15 and 16, the angled teeth 14 are closer to the mouth of the connector than they were in the first example. They are positioned in such a way that the ramp surface 42 on the locking ring 40 pushes them inwardly into the tube T as best shown in FIG. 16. Thus, the ramp surface 42 biases both the angled teeth 14 and the second teeth 33 on the collet (not shown in FIGS. 15 and 16 as they are out of the plane of the section) into engagement with the tube T.

What is claimed is:

1. A connector comprising:
   a body with a central throughway in which a tube is received, in use, and defining a main axis at its centre;
   a collet retained within the body, the collet comprising a plurality of flexible legs, the legs being arranged to bear against a cam surface in the body such that a force on the collet tending to pull it out of the body causes the legs to interact with the cam surface and be deflected inwardly to grip the tube, in use; and
   at least one first tooth, the first tooth having a gripping edge in a plane angled to a plane perpendicular to the axis, and being mounted with respect to the body so as to be non-rotatable about the main axis.

2. The connector according to claim 1, wherein the plane of the gripping edge is angled between 20° and 70° with respect to the plane perpendicular to the axis.

3. The connector according to claim 1, wherein the plane of the gripping edge is angled between 30° and 60° with respect to the plane perpendicular to the axis.

4. The connector according to claim 1, wherein the or each first tooth is in a bushing which is non-rotatable about the main axis with respect to the body.

5. The connector according to claim 4, further comprising a bushing which has at least one leg which co-operates with the collet legs to prevent rotation of the collet.

6. The connector according to claim 5, wherein the bushing provides the component different from the collet.

7. The connector according to claim 1, wherein the body has a tapered surface which tapers in the axial direction and is positioned to urge the or each first tooth radially inwardly as it is moved axially into the body.

8. The connector according to claim 7, wherein the body comprises a locking ring and a main body portion, wherein the locking ring which is arranged to be advanced along the main body portion of the body after insertion of the tube and, in doing so, to cause the tapered surface to urge the first teeth radially inwardly.

9. The connector according to claim 1, wherein the body is provided with a radially tapered surface positioned to urge the first tooth or teeth radially inwardly as they are urged about the axis.

10. The connector according to claim 1, further comprising at least one second tooth, the second tooth being on the collet and having a gripping edge in the plane perpendicular to the axis.

11. The connector according to claim 1, wherein there are a plurality of discrete first teeth circumferentially spaced about the main axis.

12. The connector according to claim 11, wherein each first tooth is angled in the opposite sense to a first tooth on the opposite side of the connector.

13. The connector according to claim 1, wherein the or each first tooth is in the collet and the collet is non-rotatable about the main axis with respect to the body.

14. The connector according to claim 13, wherein the collet is engageable with features on the inside of the body.

15. The connector according to claim 14, wherein the collet is provided with features on the end faces of the legs which engage with complementary features that are fixed with respect to the body to prevent rotation of the collet.

\* \* \* \* \*